US012776985B2

(12) United States Patent
Hu et al.

(10) Patent No.: US 12,776,985 B2
(45) Date of Patent: Oct. 27, 2026

(54) ROUTE ADVERTISEMENT METHOD, APPARATUS, AND SYSTEM

(71) Applicant: Huawei Technologies Co., Ltd., Shenzhen (CN)

(72) Inventors: Zhibo Hu, Beijing (CN); Guoqi Xu, Beijing (CN); Yaqun Xiao, Beijing (CN); Fang Gao, Shenzhen (CN); Lei Bao, Nanjing (CN); Sheng Fang, Beijing (CN); Zhenxing Wang, Beijing (CN); Pingan Yang, Nanjing (CN); Cuijun Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 521 days.

(21) Appl. No.: 18/324,350

(22) Filed: May 26, 2023

(65) Prior Publication Data

US 2023/0327986 A1 Oct. 12, 2023

Related U.S. Application Data

(63) Continuation of application No. PCT/CN2021/133763, filed on Nov. 27, 2021.

(30) Foreign Application Priority Data

Nov. 27, 2020 (CN) ......................... 202011368375.5
Dec. 4, 2020 (CN) ......................... 202011414094.9
(Continued)

(51) Int. Cl.
*H04L 45/586* (2022.01)
*H04L 12/46* (2006.01)
*H04L 45/745* (2022.01)

(52) U.S. Cl.
CPC ........ *H04L 45/586* (2013.01); *H04L 12/4679* (2013.01); *H04L 45/745* (2013.01)

(58) Field of Classification Search
CPC . H04L 45/586; H04L 12/4679; H04L 45/745; H04L 45/85; H04L 45/34;
(Continued)

(56) References Cited

U.S. PATENT DOCUMENTS 10,887,225 B1 * 1/2021 Chan ....................... H04L 45/34
2020/0099611 A1 * 3/2020 Filsfils .................. H04L 45/302
(Continued)

FOREIGN PATENT DOCUMENTS

CN 110266594 A 9/2019
CN 110535766 A 12/2019
(Continued)

OTHER PUBLICATIONS

P. Psenak et al: IGP Flexible Algorithm draft-ietf-lsr-flex-algo-12, IETF, Oct. 7, 2020, total 31 pages.

*Primary Examiner* — Kibrom T Hailu
(74) *Attorney, Agent, or Firm* — Slater Matsil, LLP

(57) ABSTRACT

A network system includes a first network device, a second network device, and a third network device. The first network device is configured to: obtain a first route advertisement message, where the first route advertisement message includes a first route prefix; and obtain a second route prefix based on the first route prefix, where the second route prefix corresponds to a first network slice, and the second route prefix is a subnet prefix of the first route prefix. The first network device advertises a second route advertisement message to the second network device, where the second route advertisement message includes the second route prefix.

20 Claims, 6 Drawing Sheets

(30) Foreign Application Priority Data

Jan. 25, 2021 (WO) ................ PCT/CN2021/073628
Feb. 10, 2021 (CN) ......................... 202110184038.9

(58) Field of Classification Search
CPC ... H04L 45/748; H04L 45/74; H04L 41/0889; H04L 45/54; H04L 45/04
See application file for complete search history.

(56) References Cited

U.S. PATENT DOCUMENTS

| | | | | |
|---|---|---|---|---|
| 2020/0127913 | A1* | 4/2020 | Filsfils | H04L 45/741 |
| 2020/0128445 | A1* | 4/2020 | Dong | H04W 28/0268 |
| 2020/0351188 | A1* | 11/2020 | Arora | H04L 45/08 |
| 2020/0351766 | A1* | 11/2020 | Young | H04W 40/246 |
| 2021/0328906 | A1* | 10/2021 | Peng | H04L 45/74 |

FOREIGN PATENT DOCUMENTS

| | | | |
|---|---|---|---|
| CN | 110912795 | A | 3/2020 |
| CN | 111107004 | A | 5/2020 |
| CN | 111385207 | A | 7/2020 |

* cited by examiner

ROUTE ADVERTISEMENT METHOD, APPARATUS, AND SYSTEM

CROSS-REFERENCE TO RELATED APPLICATIONS

This application is a continuation of International Application No. PCT/CN2021/133763, filed on Nov. 27, 2021, which claims priority to Chinese Patent Application No. 202011368375.5, filed on Nov. 27, 2020 and Chinese Patent Application No. 202011414094.9, filed on Dec. 4, 2020 and International Application No. PCT/CN2021/073628, filed on Jan. 25, 2021 and Chinese Patent Application No. 202110184038.9, filed on Feb. 10, 2021. All of the aforementioned patent applications are hereby incorporated by reference in their entireties.

TECHNICAL FIELD

This application relates to the communication field, and in particular, to a route advertisement method, an apparatus, and a system.

BACKGROUND

In some scenarios, for example, in a cloud computing scenario, computing tasks are distributed in a resource pool including a large quantity of computers, so that various application systems can obtain computing capabilities, storage space, and various software services as required. In a cloud computing system, a cloud server may be deployed in a centralized manner, and all application systems are run on the cloud server, so that a user (such as an individual user or an enterprise user) accesses the cloud server through a terminal.

A manner in which the user accesses the cloud server through the terminal is usually as follows: The terminal of the user accesses a backbone network through a metropolitan area network connected to the terminal, and then accesses a cloud service connected to the backbone network. To ensure quality of accessing a network by a user, an end-to-end tunnel that meets a network quality requirement needs to be established between the metropolitan area network and the backbone network, so that the user can access the cloud server through the tunnel. In an existing scenario, an operator usually deploys a network slicing technology on the backbone network, and uses different network slices to provide network services of different quality. However, in a scenario in which network slices are used on the backbone network, to enable different network slices to transmit different service packets, use of the network slices needs to be configured on a forwarding plane. Consequently, the network slices are inflexibly used, and the configuration is complex.

SUMMARY

This application provides a route advertisement method and apparatus, a network device, and the like, to resolve a problem that network slices are inflexibly used and configuration is complex. Technical solutions are as follows:

According to a first aspect, a route advertisement network system is provided. The network system includes a first network device and a second network device. The first network device is configured to: obtain a first route advertisement message, where the first route advertisement message includes a first route prefix; obtain a second route prefix based on the first route prefix, where the second route prefix corresponds to a first network slice, and the second route prefix is a subnet prefix of the first route prefix; and advertise a second route advertisement message to the second network device, where the second route advertisement message includes the second route prefix. The second network device is configured to receive the second route advertisement message, and generate, based on the second route advertisement message, a forwarding entry including the second route prefix.

After receiving the first route prefix, the first network device may obtain, based on the first route prefix and a network slice, the second route prefix corresponding to the network slice, and advertise the second route prefix in a network. A manner of advertising by automatically associating a route with a network slice on a control plane is used, so that network slices can be flexibly used, and related configurations in the network are reduced.

In a possible implementation, the network system further includes a third network device. The third network device is configured to: obtain a first segment identifier, where the first segment identifier includes a first identifier, the first identifier corresponds to the first network slice, and the first segment identifier is a subnet prefix of the second route prefix; and advertise a fourth route advertisement message to the second network device, where the fourth route advertisement message includes the first segment identifier and a fourth route prefix. The second network device is further configured to generate, based on the fourth route advertisement message, a forwarding entry including the fourth route prefix and the first segment identifier.

An identifier of a network slice is carried in a segment identifier, so that a device in the network, for example, an edge device in the network, can obtain a forwarding entry of the first segment identifier corresponding to the first network slice. In this way, when a packet in the network carries the segment identifier, a network device may send the packet based on a network slice corresponding to the segment identifier, so that a quantity of configurations used when the network slice is used in the network can be reduced.

In a possible implementation, the first segment identifier includes a virtual private network (VPN) segment identifier (SID).

After a VPN SID is associated with a network slice, a VPN-protected private network packet can be forwarded using the network slice, so that a quantity of configurations used when the network slice is used in the network can be greatly reduced.

In a possible implementation, the first segment identifier includes a function part, and the function part indicates to obtain an identifier of a network slice from the first segment identifier.

The identifier of the network slice indicated to be obtained from the segment identifier is provided, so that network slices can be more flexibly used.

In a possible implementation, the second network device receives a first packet, and matches, based on a destination address of the first packet, the forwarding entry including the fourth route prefix, to generate a second packet, where the second packet includes the first segment identifier. The second network device matches, based on the first segment identifier, the forwarding entry including the second route prefix, and sends the second packet based on the first network slice corresponding to the second route prefix.

When the packet in the network carries the segment identifier corresponding to the network slice, the network device may send the packet based on the network slice corresponding to the segment identifier, so that the quantity of configurations used when the network slice is used in the network can be reduced.

In a possible implementation, a hop-by-hop options header of the second packet includes an identifier of the first network slice.

After obtaining information about the network slice corresponding to the packet, the edge device in the network may include the identifier of the network slice in the packet, so that another device in the network sends a packet based on the identifier of the network slice. This can further reduce a quantity of configurations related to a network slice in the network, and improve a forwarding efficiency.

In a possible implementation, the first segment identifier includes a location locator address of the third network device, and the first route prefix is a subnet prefix of the locator address. The first network device is further configured to: obtain a third route prefix based on the first route prefix, where the third route prefix corresponds to a second network slice, and the third route prefix is a subnet prefix of the first route prefix; and advertise a third route advertisement message, where the third route advertisement message includes the third route prefix. The second network device is further configured to obtain the third route advertisement message, and generate, based on the third route advertisement message, a forwarding entry including the third route prefix. The third network device is further configured to: obtain a second segment identifier, where the second segment identifier includes the locator address and a second identifier, the second identifier corresponds to the second network slice, the second segment identifier is a subnet prefix of the locator address, and the second segment identifier is a subnet prefix of the third route prefix; and advertise a fifth route advertisement message to the second network device, where the fifth route advertisement message includes the second segment identifier and a fifth route prefix. The second network device is further configured to obtain the fifth route advertisement message, and generate, based on the fifth route advertisement message, a forwarding entry including the fifth route prefix and the second segment identifier.

A same device provides segment identifiers for different network slices, and the segment identifiers correspond to network slices in the network, so that a small quantity of network configurations can be used to implement packet forwarding for different services based on the different network slices. Network slices can be further flexibly used, to reduce the network configurations.

In a possible implementation, the second network device is further configured to: receive a third packet, and match, based on a destination address of the third packet, the forwarding entry including the fifth route prefix, to generate a fourth packet, where the fourth packet includes the second segment identifier; and match, based on the second segment identifier, the forwarding entry including the third route prefix, and send the second packet to the second network device based on the second network slice corresponding to the third route prefix.

When the packet in the network carries a segment identifier corresponding to another network slice, the network device may send the packet based on the network slice corresponding to the segment identifier, so that a quantity of configurations used when the network slice is used in the network can be reduced.

In a possible implementation, the first network device and the third network device belong to different autonomous system (AS) domains or different interior gateway protocol (IGP) domains.

In a possible implementation, the first network device and the second network device belong to a same AS domain or a same IGP domain.

In a possible implementation, the first network slice is a network slice in an AS domain to which the first network device belongs, or the first network slice is a network slice in an IGP domain to which the first network device belongs.

In a possible implementation, the first route advertisement message includes a border gateway protocol (BGP) route advertisement message, and the second route advertisement message includes an IGP route advertisement message.

A manner of associating network slices in different AS domains or IGP domains is used, so that different networks can also control use of network slices of another network. The network slices are more flexibly used, and configuration is simpler.

According to a second aspect, a route advertisement method is provided, including: A first network device obtains a first route advertisement message, where the first route advertisement message includes a first route prefix. The first network device obtains a second route prefix based on the first route prefix, where the second route prefix corresponds to a first network slice, and the second route prefix is a subnet prefix of the first route prefix. The first network device advertises a second route advertisement message to a second network device, where the second route advertisement message includes the second route prefix.

In a possible implementation, the method further includes: The first network device receives a first packet transmitted by the second network device by using the first network slice, where the first packet includes a first segment identifier, the first segment identifier includes a first identifier, the first identifier corresponds to the first network slice, and the first segment identifier is a subnet prefix of the second route prefix. The first network device matches, based on the first segment identifier, a forwarding entry corresponding to the first route prefix, to send the first packet.

In a possible implementation, the first segment identifier includes a VPN SID, and the first identifier includes an identifier of the first network slice.

In a possible implementation, the first segment identifier includes a function part, and the function part indicates to obtain an identifier of a network slice from the first segment identifier.

In a possible implementation, the first network device generates a third route prefix based on the first route prefix, where the third route prefix is a subnet prefix of the first route prefix, the third route prefix corresponds to a second network slice, and the third route prefix is different from the first route prefix.

The first network device advertises a third route advertisement message to the second network device, where the third route advertisement message includes the third route prefix.

In a possible implementation, the first network device receives a second packet, where the second packet includes a second segment identifier, and the second segment identifier is a subnet prefix of the third route prefix. The first network device matches, based on the first segment identifier, the forwarding entry corresponding to the first route prefix, to send the second packet.

In a possible implementation, the first network device and the second network device belong to a same AS domain or a same IGP domain.

In a possible implementation, the first network slice is a network slice in an AS domain to which the first network device belongs, or the first network slice is a network slice in an IGP domain to which the first network device belongs.

In a possible implementation, the first route advertisement message includes a border gateway protocol BGP route message, and the second route advertisement message includes an interior gateway protocol IGP route message.

According to a third aspect, a route advertisement method is provided, including: A second network device obtains a route advertisement message that is sent by a first network device and that includes a second route prefix, where the second route prefix is obtained by the first network device based on a first route prefix, the second route prefix is a subnet prefix of the first route prefix, and the second route prefix corresponds to a first network slice. The second network device generates a forwarding entry including the second route prefix.

In a possible implementation, the second network device obtains a route advertisement message including a first segment identifier and a first destination route prefix, where the first segment identifier includes a first identifier, the first identifier corresponds to the first network slice, and the first segment identifier is a subnet prefix of the second route prefix. The second network device generates a forwarding entry including the first destination route prefix and the first segment identifier.

In a possible implementation, the first segment identifier includes a VPN SID.

In a possible implementation, the first segment identifier includes a function part, and the function part indicates to obtain an identifier of a network slice from the first segment identifier.

In a possible implementation, the second network device receives a first packet, and matches, based on a destination address of the first packet, the forwarding entry including the first destination route prefix, to generate a second packet, where a destination address of the second packet includes the first segment identifier. The second network device matches, based on the first segment identifier, the forwarding entry including the second route prefix, and forwards the second packet based on the first network slice corresponding to the second route prefix.

In a possible implementation, a hop-by-hop options header of the second packet includes an identifier of the first network slice.

In a possible implementation, the first segment identifier includes a location locator address of a third network device, and the first route prefix is a subnet prefix of the locator address. The method further includes: The second network device obtains a route advertisement message including a third route prefix, where the third route prefix is obtained by the first network device based on the first route prefix, the third route prefix is a subnet prefix of the first route prefix, and the third route prefix corresponds to a second network slice. The second network device generates a forwarding entry including the third route prefix. The second network device receives a route advertisement message that is sent by the third network device and that includes a second segment identifier and a second destination route prefix, where the second segment identifier includes the locator address and a second identifier, and the second identifier corresponds to the second network slice. The second network device generates a forwarding entry including the second destination route prefix and the second segment identifier.

In a possible implementation, the second network device receives a third packet, matches, based on a destination address of the third packet, the forwarding entry including the second destination route prefix, to generate a fourth packet, where the fourth packet includes the second segment identifier. The second network device matches, based on the second segment identifier, the forwarding entry including the third route prefix, and forwards the fourth packet based on the second network slice corresponding to the third route prefix.

In a possible implementation, the first identifier includes the identifier of the first network slice.

According to a fourth aspect, a route advertisement method is provided, including: A third network device obtains a first segment identifier, where the first segment identifier includes a first identifier, and the first identifier corresponds to a first network slice. The third network device sends a route advertisement message including the first segment identifier and a first destination route prefix to a second network device, so that the second network device generates a forwarding entry including the first destination route prefix and the first segment identifier, where the forwarding entry is used by the second network device to send a packet to a first network device by using the first network slice.

In a possible implementation, the first identifier includes an identifier of the first network slice.

In a possible implementation, the first segment identifier includes a locator address of the third network device and the identifier of the first network slice, and the first segment identifier is a subnet prefix of the locator address. The method further includes: The third network device further obtains a second segment identifier, where the second segment identifier includes the locator address and a second identifier, and the second identifier corresponds to a second network slice. The third network device sends a route advertisement message including the second segment identifier and a second destination route prefix to the second network device.

In a possible implementation, the second network device sends a route prefix including the locator address to the first network device.

In a possible implementation, the first segment identifier includes a VPN SID.

In a possible implementation, the first segment identifier includes a function part, and the function part indicates to obtain an identifier of a network slice from the first segment identifier.

In a possible implementation, the second network device and the third network device are border gateway protocol peers.

According to a fifth aspect, a route advertisement method is provided, including: A third network device obtains a first segment identifier, where the first segment identifier includes an identifier of a first network slice. The third network device advertises a first route advertisement message, where the first route advertisement message includes the first segment identifier.

In a possible implementation, the first segment identifier is a virtual private network segment identifier VPN SID.

In a possible implementation, the third network device further receives a second packet sent by a second network device based on the first network slice, where the second packet includes the first segment identifier.

According to a sixth aspect, a route advertisement method is provided, including: A second network device receives a first route advertisement message sent by a third network device, where the first route advertisement message includes a first segment identifier. The second network device generates, based on the first route advertisement message, a first forwarding entry including the first segment identifier.

In a possible implementation, the second network device receives a first packet, and matches the first forwarding entry based on a destination address of the first packet, to generate a second packet, so that the second packet includes the first segment identifier. The second network device sends, based on that the first segment identifier corresponds to a first network slice, the second packet by using the first network slice.

In a possible implementation, an Internet Protocol version 6 (Internet Protocol version 6, IPv6) extension header of the second packet includes an identifier of the first network slice.

In a possible implementation, the IPv6 extension header includes a hop-by-hop options header or a destination options header.

In a possible implementation, the first segment identifier includes a function part, and the function part indicates to obtain an identifier of a network slice from the first segment identifier.

In a possible implementation, the identifier of the network slice shown in the foregoing aspects includes a flexible algorithm identifier or a slice identifier.

According to a seventh aspect, a route advertisement apparatus is provided, applied to a first network device and including an obtaining module, a processing module, and a sending module. The obtaining module is configured to obtain a first route advertisement message, where the first route advertisement message includes a first route prefix. The processing module is configured to obtain a second route prefix based on the first route prefix, where the second route prefix corresponds to a first network slice, and the second route prefix is a subnet prefix of the first route prefix. The sending module is configured to advertise a second route advertisement message to a second network device, where the second route advertisement message includes the second route prefix.

In a possible implementation, the obtaining module is further configured to receive a first packet transmitted by the second network device by using the first network slice, where the first packet includes a first segment identifier, the first segment identifier includes a first identifier, the first identifier corresponds to the first network slice, and the first segment identifier is a subnet prefix of the second route prefix. The sending module is configured to match, based on the first segment identifier, a forwarding entry corresponding to the first route prefix, to send the first packet.

In a possible implementation, the first segment identifier includes a VPN SID, and the first identifier includes an identifier of the first network slice.

In a possible implementation, the first segment identifier includes a function part, and the function part indicates to obtain an identifier of a network slice from the first segment identifier.

In a possible implementation, the processing module is configured to generate a third route prefix based on the first route prefix, where the third route prefix is a subnet prefix of the first route prefix, the third route prefix corresponds to a second network slice, and the third route prefix is different from the first route prefix. The sending module is configured to advertise a third route advertisement message to the second network device, where the third route advertisement message includes the third route prefix.

In a possible implementation, the obtaining module is configured to receive a second packet, where the second packet includes a second segment identifier, and the second segment identifier is a subnet prefix of the third route prefix. The sending module is configured to match, based on the first segment identifier, the forwarding entry corresponding to the first route prefix, to send the second packet.

In a possible implementation, the first network device and the second network device belong to a same AS domain or a same IGP domain.

In a possible implementation, the first network slice is a network slice in an AS domain to which the first network device belongs, or the first network slice is a network slice in an IGP domain to which the first network device belongs.

In a possible implementation, the first route advertisement message includes a border gateway protocol BGP route message, and the second route advertisement message includes an interior gateway protocol IGP route message.

According to an eighth aspect, a route advertisement apparatus is provided, applied to a second network device and including an obtaining module and a processing module. The obtaining module is configured to obtain a route advertisement message that is sent by a first network device and that includes a second route prefix, where the second route prefix is obtained by the first network device based on a first route prefix, the second route prefix is a subnet prefix of the first route prefix, and the second route prefix corresponds to a first network slice. The processing module is configured to generate a forwarding entry including the second route prefix.

In a possible implementation, the second network device obtains a route advertisement message including a first segment identifier and a first destination route prefix, where the first segment identifier includes a first identifier, the first identifier corresponds to the first network slice, and the first segment identifier is a subnet prefix of the second route prefix. The second network device generates a forwarding entry including the first destination route prefix and the first segment identifier.

In a possible implementation, the first segment identifier includes a VPN SID.

In a possible implementation, the first segment identifier includes a function part, and the function part indicates to obtain an identifier of a network slice from the first segment identifier.

In a possible implementation, the apparatus further includes a sending module. The obtaining module is configured to receive a first packet, and match, based on a destination address of the first packet, the forwarding entry including the first destination route prefix, to generate a second packet, where a destination address of the second packet includes the first segment identifier. The sending module is configured to match, based on the first segment identifier, a forwarding entry including the second route prefix, and forward the second packet based on the first network slice corresponding to the second route prefix.

In a possible implementation, a hop-by-hop options header of the second packet includes an identifier of the first network slice.

In a possible implementation, the first segment identifier includes a location locator address of a third network device, and the first route prefix is a subnet prefix of the locator address. The obtaining module is further configured to obtain a route advertisement message including a third route prefix, where the third route prefix is obtained by the first network device based on the first route prefix, the third route prefix is a subnet prefix of the first route prefix, and the third route prefix corresponds to a second network slice. The second network device generates a forwarding entry including the third route prefix, receives a route advertisement message that is sent by the third network device and that includes a second segment identifier and a second destination route prefix, where the second segment identifier includes the locator address and a second identifier, and the second identifier corresponds to the second network slice. The processing module is configured to generate a forwarding entry including the second destination route prefix and the second segment identifier.

In a possible implementation, the obtaining module is configured to receive a third packet. The processing module is configured to match, based on a destination address of the third packet, the forwarding entry including the second destination route prefix, to generate a fourth packet, where the fourth packet includes the second segment identifier. The sending module is configured to match, based on the second segment identifier, the forwarding entry including the third route prefix, and forward the fourth packet based on the second network slice corresponding to the third route prefix.

In a possible implementation, the first identifier includes the identifier of the first network slice.

According to a ninth aspect, a route advertisement apparatus is provided, applied to a third network device and including an obtaining module and a sending module. The obtaining module is configured to obtain a first segment identifier, the first segment identifier includes a first identifier, and the first identifier corresponds to a first network slice. The sending module is configured to send a route advertisement message including the first segment identifier and a first destination route prefix to a second network device, so that the second network device generates a forwarding entry including the first destination route prefix and the first segment identifier, where the forwarding entry is used by the second network device to send a packet to a first network device by using the first network slice.

In a possible implementation, the first identifier includes an identifier of the first network slice.

In a possible implementation, the first segment identifier includes a locator address of the third network device and the identifier of the first network slice, and the first segment identifier is a subnet prefix of the locator address. The obtaining module is further configured to obtain a second segment identifier, where the second segment identifier includes the locator address and a second identifier, and the second identifier corresponds to a second network slice. The sending module is configured to send a route advertisement message including the second segment identifier and a second destination route prefix to the second network device.

In a possible implementation, the sending module is further configured to send a route prefix including the locator address to the first network device.

In a possible implementation, the first segment identifier includes a VPN SID.

In a possible implementation, the first segment identifier includes a function part, and the function part indicates to obtain an identifier of a network slice from the first segment identifier.

In a possible implementation, the second network device and the third network device are border gateway protocol peers.

According to a tenth aspect, a route advertisement apparatus is provided, applied to a third network device and including an obtaining module and a sending module. The obtaining module is configured to obtain a first segment identifier, where the first segment identifier includes an identifier of a first network slice. The sending module is configured to advertise a first route advertisement message, where the first route advertisement message includes the first segment identifier.

In a possible implementation, the first segment identifier is a virtual private network segment identifier VPN SID.

In a possible implementation, the obtaining module is further configured to receive a second packet sent by a second network device based on the first network slice, where the second packet includes the first segment identifier.

According to a tenth aspect, a route advertisement apparatus is provided, including: A second network device receives a first route advertisement message sent by a third network device, where the first route advertisement message includes a first segment identifier. The second network device generates, based on the first route advertisement message, a first forwarding entry including the first segment identifier.

In a possible implementation, the second network device receives a first packet, and matches the first forwarding entry based on a destination address of the first packet, to generate a second packet, so that the second packet includes the first segment identifier. The second network device sends, based on that the first segment identifier corresponds to a first network slice, the second packet by using the first network slice.

In a possible implementation, an Internet Protocol version 6 (Internet Protocol version 6, IPv6) extension header of the second packet includes an identifier of the first network slice.

In a possible implementation, the IPv6 extension header includes a hop-by-hop options header or a destination options header.

In a possible implementation, the first segment identifier includes a function part, and the function part indicates to obtain an identifier of a network slice from the first segment identifier.

In a possible implementation, the identifier of the network slice shown in the foregoing aspects includes a flexible algorithm identifier or a slice identifier.

According to an eleventh aspect, a route advertisement apparatus is provided, applied to a second network device and including: an obtaining module, configured to receive a first route advertisement message sent by a third network device, where the first route advertisement message includes a first segment identifier; and a processing module, configured to generate, based on the first route advertisement message, a first forwarding entry including the first segment identifier.

In a possible implementation, the obtaining module is further configured to receive a first packet, and match the first forwarding entry based on a destination address of the first packet, to generate a second packet, so that the second packet includes the first segment identifier. The apparatus further includes a sending module, configured to send, based on that the first segment identifier corresponds a first network slice, the second packet by using the first network slice.

In a possible implementation, an Internet Protocol version 6 (Internet Protocol version 6, IPv6) extension header of the second packet includes an identifier of the first network slice.

In a possible implementation, the IPv6 extension header includes a hop-by-hop options header or a destination options header.

In a possible implementation, the first segment identifier includes a function part, and the function part indicates to obtain an identifier of a network slice from the first segment identifier.

In a possible implementation, the identifier of the network slice shown in the foregoing aspects includes a flexible algorithm identifier or a slice identifier.

According to a twelfth aspect, a communication device is provided. The device includes a communication interface and a processor. The processor is configured to execute instructions, to control the communication interface to receive a signal and control the communication interface to send a signal. When the processor executes the instructions, the processor is enabled to perform the method in any one of the first aspect to the sixth aspect or any possible implementation of the first aspect to the sixth aspect.

In a possible implementation, the communication device further includes a memory. The memory is configured to store the instructions.

In a possible implementation, there are one or more processors, and there are one or more memories.

In a possible implementation, the memory may be integrated with the processor, or the memory and the processor are disposed separately.

According to a thirteenth aspect, a network system is provided. The network system includes a second network device and a third network device. The second network device may be the route advertisement apparatus provided in the eleventh aspect, and the third network device may be the route advertisement apparatus provided in the tenth aspect.

According to a fourteenth aspect, a computer program product is provided. The computer program product includes computer program code. When the computer program code is run by a computer, the computer is enabled to perform the methods in the foregoing aspects.

According to a fifteenth aspect, a computer-readable storage medium is provided. The computer-readable storage medium stores a program or instructions. When the program or the instructions is/are run on a computer, the computer is enabled to perform the methods in the foregoing aspects.

According to a sixteenth aspect, a chip is provided, including a processor, configured to invoke, from a memory, instructions stored in the memory and run the instructions, to enable a communication device on which the chip is installed to perform the methods in the foregoing aspects.

According to a seventeenth aspect, another chip is provided, including an input interface, an output interface, a processor, and a memory. The input interface, the output interface, the processor, and the memory are connected through an internal connection path. The processor is configured to execute code in the memory. When the code is executed, the processor is configured to perform the methods in the foregoing aspects.

DETAILED DESCRIPTION OF ILLUSTRATIVE EMBODIMENTS

Figure 1:
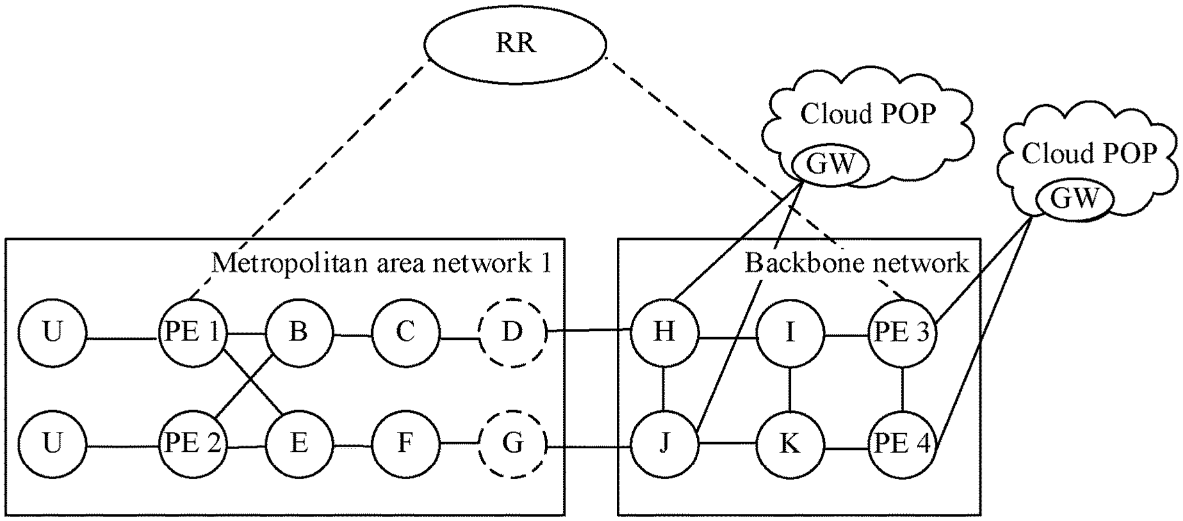
FIG. 1 is a schematic diagram of a network scenario according to an embodiment of this application.

In order to enable a person skilled in the art to better understand the solutions in the present invention, the following further describes embodiments of the present invention in detail with reference to accompanying drawings and implementations.

The following describes terms in embodiments of this application.

Subnet prefix: If high-bit addresses of two route prefixes are the same, a route prefix with a longer mask length is a subnet prefix of a route prefix with a shorter mask length. For example, when a first route prefix is A2::0/64 and a second route prefix is A2::0/63, A2::0/64 is a subnet prefix of A2::0/63. When the first route prefix is A2:0:0:0:80::1/72 and the second route prefix is A2::0/64, A2:0:0:0:80::1/72 is a subnet prefix of A2::0/64. When the first route prefix is A2:0:0:0:80::1/72 and the second route prefix is A2:0:0:0:80::1/128, A2:0:0:0:80::1/128 is a subnet prefix of A2:0:0:0:80::1/72. When mask lengths of two route prefixes are the same, the two route prefixes are considered as subnet prefixes of each other. For example, when the first route prefix is A2:0:0:0:80::1/72 and the second route prefix is A2:0:0:0:80/72, it is considered that the two route prefixes are subnet prefixes of each other.

Segment routing (SR) is a protocol designed based on an idea of source routing to forward data packets in a network. The SR divides a network path into segments and allocates segment identifiers (SIDs) to the segments and network nodes. An SID list (SID List, also referred to as a label stack in SR-MPLS) may be obtained by sorting the SIDs in order. The SID list may indicate a forwarding path. With an SR technology, a node and a path through which a data packet carrying the SID list passes may be specified, to meet a traffic optimization requirement. To make an analogy, the data packet may be compared to luggage, and the SR may be compared to attaching a label to the luggage. If the luggage needs to be sent from a region A to a region D through a region B and a region C, a label indicating to "go to the region B first, then to the region C, and finally to the region D" may be attached to the luggage in the origin region A. In this way, the label on the luggage simply needs to be identified in each region, and the luggage may be forwarded from one region to another region based on the label of the luggage. In the SR technology, a headend adds a label to the data packet, and an intermediate node may forward the data packet to a next node based on the label until the data packet arrives at a destination node. For example, <SID 1, SID 2, SID 3> is inserted into a packet header of a data packet, and the data packet is first forwarded to a node corresponding to the SID 1, then forwarded to a node corresponding to the SID 2, and then forwarded to a node corresponding to the SID 3. SR-MPLS is short for segment routing multi-protocol label switching.

Internet protocol version 6 (Internet Protocol Version 6, IPv6)-based segment routing (SRv6) indicates applying the SR technology to an IPv6 network. An IPv6 address (128 bits) is used as a representation of an SID. When forwarding a data packet, a network device supporting SRv6 queries a local segment identifier table (local SID table) based on a destination address (DA) in the data packet. When a longest match is found between the destination address of the data packet and any SID in the local segment identifier table, the network device performs, according to a policy related to the SID in the local segment identifier table, an operation corresponding to the policy. For example, the network device may forward the data packet through an outbound interface corresponding to the SID. If no longest match is found between the destination address of the data packet and any SID in the local segment identifier table, the network device queries an IPv6 forwarding table, and performs longest-match forwarding based on the IPv6 forwarding table.

A segment identifier (SID), for example, represents a node or a link. In the SRv6, an SID is represented as a 128-bit value. In the SR-MPLS, an SID is represented as a label value. An SRv6 segment identifier may include a function part, and the function part indicates a network device that advertises the segment identifier to perform a corresponding action.

In an example of the SRv6, a value of the segment identifier includes the following parts: location information (a Locator) and a function, and optionally, may further include an argument. A form of the SRv6 SID is a form of the IPv6 address.

Segment routing header (SRH): An IPv6 packet includes an IPv6 standard header, an extension header, and a Payload. To implement the SRv6 based on an IPv6 forwarding plane, an IPv6 extension header is added, which is referred to as an SRH extension header. The SRH extension header includes segment list information and specifies an explicit path. It has a same function as the segment list in the SR MPLS. A headend adds the SRH extension header to the IPv6 packet, so that an intermediate node may forward the packet based on path information included in the SRH extension header. Specifically, there are two pieces of key information in the SRH. One is a segment list in an IPv6 address form, which is similar to label stack information in a multi-protocol label switching (MPLS) network, and a segment list including a plurality of sequentially arranged segment identifiers (SIDs) indicates an explicit path in SR. The other one is a segment left (SL), where the SL is a pointer used to indicate a current segment identifier. On an SRv6 network, a value of a DA field in the IPv6 packet constantly changes. The value of the DA field is determined by both the SL and the segment list. When the pointer SL points to a to-be-processed segment, for example, a segment list [2], an IPv6 address of the segment list [2] needs to be copied to the DA field.

On a forwarding plane, if a node supports the SR, and a segment identifier of the node is in a destination address of the IPv6 packet, after receiving the packet, the node may decrease the SL by 1, offset the pointer to a new segment, copy a segment identifier (that is, in a IPv6 address format) corresponding to the SL after the SL is decreased by 1 to the DA field, and then forward the packet to a next node. Usually, when an SL field decreases to 0, the node may pop up the SRH packet header, and then perform next processing on the packet. If a node does not support the SR, the node does not need to process SRH information in the IPv6 packet. Instead, the node searches an IPv6 routing table based on an IPv6 destination address field, and normally forwards the IPv6 packet.

An SR policy is a traffic engineering mechanism for SR. Usually, the SR policy includes: a headend, a color identifier, a destination identifier (Endpoint), and a segment identifier list indicating a forwarding path. The headend identifies a headend that executes the SR policy. The color is used to associate the SR with a service attribute such as low latency and a high bandwidth, to summarize a service capability of the SR policy. The endpoint identifies a destination address of the SR policy. Usually, the SR Policy is determined based on the headend (headend, color, and endpoint). For a same headend, one policy may alternatively be determined based on (color and endpoint). The SR policy may include one or more segment identifier lists, to implement functions such as load balancing and multipath backup. When forwarding a packet, the headend may determine, according to the SR policy, a segment identifier list corresponding to the packet, to determine a forwarding path for forwarding the packet, and encapsulate the segment identifier list into the packet to display or disperse an indication path.

Network slicing: A network slicing technology may also be understood as a virtual network technology. The network slicing technology may be a network slicing technology using a flexible algorithm (Flex-Algo) or a slicing technology on a forwarding plane, or may be a network slicing technology in another form. A network slice may be represented by using a Flex-Algo identifier or a slice identifier (Slice ID).

The foregoing briefly describes related terms in embodiments of this application. The following describes the technical solutions provided in this application with reference to a network scenario shown in FIG. 1.

As shown in FIG. 1, in a network, a backbone network, a metropolitan area network 1, and a route reflector (RR) or a control device (not shown in the figure) are included. In the metropolitan area network 1, an access device U for accessing a user, a provider edge (provider edge, PE) device, a PE 1, a PE 2, and other network devices such as B, C, D, E, F and G are included. In the backbone network, PE devices: a PE 3 and a PE 4, and other network devices such as H, I, J, and K are included. In this network scenario, more networks, for example, a private network of an enterprise customer and more metropolitan area networks, may further be included. Optionally, in the network, a cloud access point (a point of presence, POP) is further included, and the cloud POP may be connected to nodes H and J of the backbone network, or be connected to nodes PE 3 and PE 4.

In the network shown in FIG. 1, the metropolitan area network 1 and the backbone network may belong to different autonomous system (AS) domains or different IGP domains, where the backbone network may be a network running a network slicing technology. A user may access, through the U device of the metropolitan area network and through the node PE 1, a cloud service provided by a cloud POP connected to the node PE 3 of the backbone network. Alternatively, a user may access, through the node PE 3 of the backbone network, a service provided by a network connected to the node PE 1 of the metropolitan area network. Usually, a VPN service may be used to provide transmission tunnels of different network quality for different user services. Different users can access different virtual private network (VPN) instances of a metropolitan area or backbone PE node. In the network shown in FIG. 1, a private network route of the user and corresponding VPN instance information may be sent to a peer device through the RR. For example, if there is a private network route of a user A on the PE 1, a destination address of the private network route is an IP 1.

The PE 1 advertises a route corresponding to the IP 1, where a prefix of the route is an IP 2, the IP 1 is a subnet prefix of the IP 2, and VPN instance information corresponding to the IP 2 is a VPN SID 1. In this case, the PE 1 may advertise the route to the RR, and the RR sends the route to the PE 3. In this case, the PE 3 correspondingly generates a forwarding entry including a route prefix IP 2, and the forwarding entry may indicate that a packet whose destination address is the IP 2 may be sent by using the VPN SID 1. After the PE 3 receives a data packet whose destination address is the IP 1, because the IP 1 is the subnet prefix of the IP 2, the PE 3 matches a route corresponding to the IP 2 according to a longest match principle, encapsulates the VPN SID 1 into the received data packet, and forwards the data packet based on the VPN SID 1, until the PE 1 receives the data packet, decapsulates the VPN SID 1, and sends the data packet based on the destination address IP 1.

In this application scenario, an example in which the backbone network is a network operating with a network slice is used. When network services of different network quality are provided in the backbone network by using different network slices, to enable different network traffic to be transmitted by using the different network slices, a large quantity of network policies need to be configured on a forwarding plane. Consequently, network slices are inflexibly used, and configuration is complex. In particular, an example of traffic from the backbone network to the metropolitan area network is used as an example. When users of different VPN instances on the metropolitan area network require different network quality, it usually needs to configure a network slice of the metropolitan area network on the metropolitan area network or specify a corresponding forwarding tunnel by using an SR list. However, a policy related to the backbone network cannot be configured on the metropolitan area network. In addition, if policies of different network slices need to be configured for different VPN instances and different users of the metropolitan area network on the backbone network, a large quantity of configuration needs to be performed on the backbone network because the backbone network and metropolitan area network belong to different IGP domains or ASs. In particular, in an existing network of an operator, a backbone network is usually connected to a plurality of metropolitan area networks, configuration is extremely complex, and network slices are extremely inflexibly used.

This application provides the following technical solutions, to resolve a problem that the network slices are inflexibly used and the configuration is complex in the foregoing network.

Figure 2:
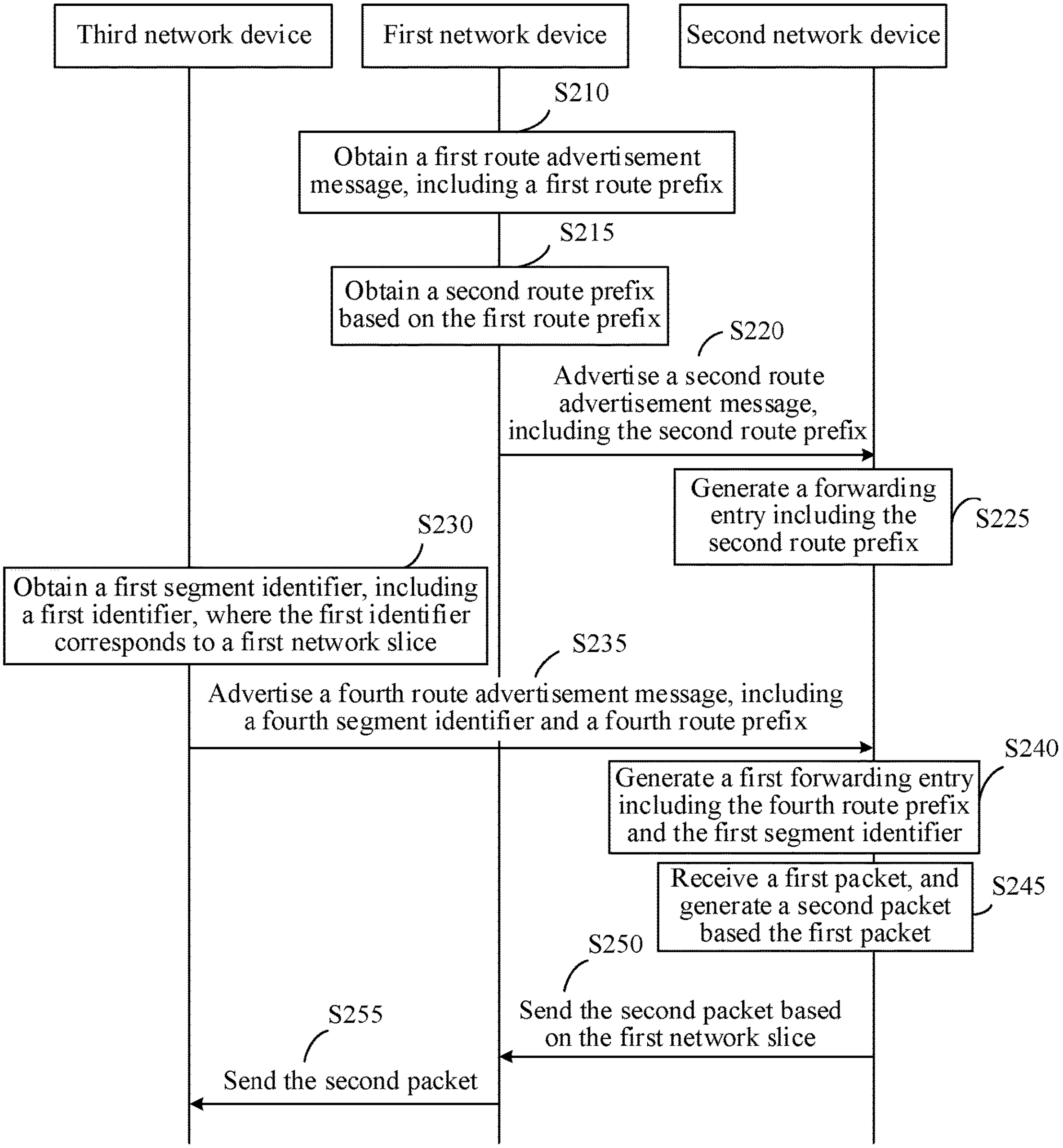
FIG. 2 is a schematic diagram of a route advertisement method according to an embodiment of this application.

As shown in FIG. 2, a schematic flowchart of a route advertisement method is provided. An example in which a method example shown in FIG. 2 is applied to the network scenario shown in FIG. 1 is used, to briefly describe the route advertisement method provided in this application.

As shown in FIG. 2, the method may be applied to a network including a first network device, a second network device, and a third network device. The first network device, the second network device, and the third network device may be any physical network device or virtual network device, such as a switch or a router, that supports a routing function. In an example, the first network device and the second network device belong to a same AS domain or a same IGP domain, and the first network device and the third network device belong to different AS domains or different IGP domains.

In the network scenario shown in FIG. 1, the first network device and the second network device belong to the backbone network. The third network device belongs to the metropolitan area network. In an example, when network slices, such as a network slice 128 and a network slice 129, are run on the backbone network, the network slice 128 represents providing a low-latency network, and the network slice 129 represents providing a high-bandwidth network. An example in which the first network device is a device H in a backbone network, the third network device is a PE 1 in a metropolitan area network 1, and the second network device is a PE 3 in the backbone network is used to describe the method example. The method example includes the following steps.

S210: The first network device obtains a first route advertisement message, where a first route message includes a first route prefix.

In an example, the first route advertisement message obtained by the first network device is sent by an intermediate network device. In the example shown in FIG. 1, the device H may receive a route advertisement message sent by a device D. The route advertisement message includes the first route prefix. In an example, the first route prefix may be a location (locator) address of the third network device. In another example, the first route prefix may alternatively be a new route prefix generated through route aggregation after an intermediate device receives the locator address route of the third network device. That is, the first route advertisement message herein is used to advertise a route related to the third network device. It may be understood that the first route advertisement message is used to advertise a route related to an address of the third network device.

An example in which a network device D is used as the intermediate network device to send the first route advertisement message is used below for description.

1. The Third Network Device Advertises the Address of the Third Network Device in a Network in which the Third Network Device is Located.

For example, a PE 1 usually advertises, in an IGP domain or an AS domain in which the PE 1 is located, routing information corresponding to a first address of the PE 1. In an example, the first address is a locator address of the PE 1. In an example, the locator address is A2::0/64. The first route advertisement message may be an IGP message or a BGP update message. All network devices belonging to a same IGP domain or AS domain as the third network device may obtain the route message. For example, network devices B, C, D, E, F, G, and PE 2 in the metropolitan area network 1 may obtain the route advertisement message.

2. The Network Device D Obtains Information about the Address Advertised by the Third Network Device.

3. The Network Device D Advertises Information Related to the Address in an AS Domain or an IGP Domain in which the Network Device D is Located.

For example, after the PE 1 advertises the route advertisement message, the network device D in the metropolitan area network 1 may advertise the routing information to another device. In an example, this manner may be referred to as importing IGP routing information into a BGP for advertisement. That is, the route advertisement message advertised by the third network device herein may be an IGP route message. After receiving the routing information, the network device D may generate a BGP route message based on the route message, and advertise the BGP route message to a BGP peer device of the network device D.

In an example, after obtaining the routing information, the network device D may directly advertise, to the device H, a first route advertisement message corresponding to a route prefix A2::0/64.

In another example, after obtaining the routing information, the network device D may further aggregate, to a specific extent, a route received from the metropolitan area network 1 and then advertise the aggregated route. For example, in addition to obtaining the routing information of A2::0/64, the network device D further obtains routing information of A2:1::0/63. In this case, the network device D may obtain an aggregated route prefix A2::0/63 through aggregation, and advertise a route message including a route prefix A2::0/63 to the device H.

Correspondingly, the device H may obtain the first route advertisement message including the first route prefix. The first route prefix may be, for example, the locator address A2::0/64 of the PE 1, or the first route prefix may be an address A2::0/63 aggregated by the device D.

After obtaining the first route advertisement message, the device H may generate a forwarding entry including the first route prefix.

S215: The first network device obtains a second route prefix based on the first route prefix.

After obtaining the first route prefix, the first network device may obtain the second route prefix based on the first route prefix. The second route prefix is a subnet prefix of the first route prefix, and the second route prefix corresponds to a first network slice.

As shown in FIG. 1, the device H is an edge device of the backbone network, and may obtain the second route prefix based on the first route prefix and the first network slice in the backbone network after obtaining the first route prefix advertised by the metropolitan area network.

For example, the first route prefix is A2::0/64, and network slices 128 and 129 are obtained through division in the backbone network. In this case, the device H may obtain a second route prefix A2:0:0:0:80/72 based on the first route prefix A2::0/64, and the second route prefix A2:0:0:0:80/72 corresponds to the network slice 128.

Herein, that the device H obtains the second route prefix based on the first route prefix includes but is not limited to the following manners:

Manner 1: The device H obtains the second route prefix based on the first route prefix and an identifier of the first network slice. That is, the second route prefix carries the identifier of the first network slice.

For example, the device H obtains the second route prefix A2:0:0:0:80/72 based on the first route prefix A2::0/64. 80 in the second route prefix is a hexadecimal value corresponding to a decimal identifier 128 of the first network slice.

Manner 2: The device H may alternatively obtain a new route prefix, for example, A2:0:0:0:1/72, based on the first route prefix and the identifier corresponding to the first network slice, for example, 128 corresponding to 1.

Optionally, the first network device may further obtain a third route prefix based on the first route prefix.

For example, the first route prefix is A2::0/64, and the network slices 128 and 129 are obtained through division in the backbone network. In this case, the device H may obtain a third route prefix A2:0:0:0:81/72 based on the first route prefix A2::0/64, and the third route prefix A2:0:0:0:81/72 corresponds to the network slice 129. 81 in the third route prefix is a hexadecimal value corresponding to a decimal identifier 129 of a second network slice.

That is, the first network device may obtain, based on the first route prefix, a route prefix corresponding to a network slice.

S220: The first network device advertises a second route advertisement message, where the second route advertisement message includes the second route prefix.

After obtaining the second route prefix, the first network device may advertise, in the backbone network in which the first network device is located, the second route advertisement message including the second route prefix.

Optionally, the second route advertisement message may further include the identifier of the first network slice corresponding to the second route prefix.

Optionally, in S225, when the first network device further obtains the third route prefix, the first network device advertises, in a network, a route advertisement message including the third route prefix. In an example, a third route advertisement message and the second route advertisement message may be a same route advertisement message, or may be different route advertisement messages.

In the network shown in FIG. 1, the device H may advertise the routes A2:0:0:0:80/72 and A2:0:0:0:81/72 by using a same IGP instance and a same route advertisement message, or may advertise the routes A2:0:0:0:80/72 and A2:0:0:0:81/72 by using different route advertisement messages respectively. The device H may alternatively advertise the two routes by using different network slices respectively. For example, A2:0:0:0:80/72 is advertised by using an IGP instance corresponding to the network slice 128, and A2:0:0:0:81/72 is advertised by using an IGP instance corresponding to the network slice 129.

The route advertisement message advertised by the device H is advertised in an IGP domain or an AS domain in which the device H is located, and finally advertised to a PE 3.

In an example, the first route advertisement message is a BGP route message, and the second route advertisement message is an IGP route message.

S225: After receiving the second route advertisement message, the second network device generates, based on the second route advertisement message, a forwarding entry including the second route prefix.

The forwarding entry including the second route prefix may be used to record forwarding information to the second route prefix.

In an example, the forwarding entry includes A2:0:0:0:80/72 and forwarding interface information corresponding to A2:0:0:0:80/72.

Optionally, the second network device may further store a correspondence between a route prefix and a network slice. Alternatively, the second network device may be configured by default to consider that some bits of information in the route prefix are the identifier of the first network slice. For example, a $65^{th}$ bit to a $72^{nd}$ bit are an identifier of a network slice.

Optionally, when the second network device further obtains the third route advertisement message including the third route prefix, the second network device further generates a forwarding entry including the third route prefix. As shown in the foregoing descriptions, when the PE 3 further receives the third route advertisement message with the third route prefix A2:0:0:0:81/72, the PE 3 may further generate a forwarding entry including A2:0:0:0:81/72.

S230: The third network device obtains a first segment identifier, where the first segment identifier includes a first identifier. The first identifier corresponds to the first network slice.

In the network scenario shown in FIG. 1, the PE 1 obtains the first segment identifier, where the first segment identifier includes the first identifier, and the first identifier may correspond to the first network slice in the backbone network. That is, the first network slice is a network slice in an AS domain or an IGP domain of the first network device.

In an example, the third network device generates the first segment identifier based on a network configuration. For example, a policy is configured on the PE 1, to indicate a VPN to access a network slice. That is, a VPN SID is allocated based on the network slice. In addition, a VPN SID corresponding to the VPN needs to be allocated from a first address of the third network device. In an example, the first address is a locator address of the third network device. In the scenario shown in FIG. 1, in this case, when generating the VPN SID, the PE 1 adds the corresponding identifier of the first network slice after the locator address.

Optionally, a dynamic identifier (ID) may be further allocated to the VPN SID, and the dynamic identifier may further identify the VPN SID.

As described in the foregoing step, a locator address obtained by the PE 1 is, for example, A2::0/64. In this case, the PE 1 may obtain, based on the locator address, the first segment identifier, for example, A2:0:0:0:80::1, corresponding to the first network slice, where A2:0:0:0 is a 64-bit prefix matching the locator, 80 is the first identifier corresponding to the first network slice, and 1 is a dynamically allocated ID. In this example, the first identifier is the hexadecimal value corresponding to the decimal identifier 128 of the first network slice. In another example, the first identifier may alternatively be another value, for example, 90, corresponding to the first network slice, provided that the PE 1 can obtain a correspondence between a network slice and the first identifier in advance.

The first segment identifier obtained in this step is a subnet prefix of the second route prefix in the foregoing step. To enable the first segment identifier to be the subnet prefix of the second route prefix, a device in the network may obtain a preconfigured generation rule of the first segment identifier and the first route prefix. For example, a length of the first identifier included in the first segment identifier is 1 greater than a length of an identifier of a network slice added when the first network device generates the second route prefix, so that the first segment identifier generated by the third network device is a subnet prefix of the second route prefix generated by the first network device.

In another example, the PE 1 may alternatively obtain a first segment identifier sent by a control device. A manner in which the control device generates the first segment identifier may be similar to the foregoing principle in which the third network device generates the first segment identifier. Details are not described again.

Optionally, the third network device may further obtain a second segment identifier. The second segment identifier includes a second identifier, and the second identifier corresponds to the second network slice. A type of the second segment identifier is consistent with a type of the first segment identifier. In an example, the second segment identifier is a VPN SID, for example, A2:0:0:0:81::2, where 81 is the hexadecimal value corresponding to the decimal identifier 129 of the second network slice.

In this example, an example in which the first segment identifier is a VPN SID is used. However, allocation of another SID may alternatively be applied. Details are not described herein in this application.

Optionally, the first segment identifier includes a function part, and the function part indicates to obtain the identifier of the network slice from the first segment identifier. That is, the function part indicates to obtain the identifier of the first network slice included in the first segment identifier.

S235: The third network device advertises a fourth route advertisement message, where the fourth route advertisement message includes the first segment identifier and a fourth route prefix.

In an example, the fourth route prefix may also be referred to as a first destination route prefix.

After obtaining the first segment identifier, the third network device may advertise a route associated with the first segment identifier to an autonomous system boundary router (autonomous system boundary router, ASBR) corresponding to the third network device, that is, advertise a fourth route advertisement message to a border gateway protocol peer corresponding to the third network device.

In an example, a private network destination address associated with the first segment identifier may include an IP 1, an IP 2, an IP 3, and the like. The third network device may enable addresses, for example, the IP 1, the IP 2, and the IP 3, of a same network segment to correspond to a first network segment, and a route prefix corresponding to the first network segment is an IP 4. In this case, the third network device may advertise the fourth route prefix IP 4 together with the first segment identifier to the second network device by using a route advertisement message. Certainly, the PE 1 may also send a fourth route advertisement message including the IP 1 and the first segment identifier to the PE 3.

In an example, the fourth route advertisement message is a BGP update message.

In the network scenario shown in FIG. 1, a manner in which the third network device sends the fourth route advertisement message to the second network device includes the following several examples:

Manner 1: Because the PE 1 and the PE 3 belong to different AS domains, the PE 1 may send a route including the third route prefix to an RR, and then the RR advertises the third route prefix to the PE 3.

Manner 2: The PE 1 may alternatively perform advertising to the PE 3 by using an ASBR. For example, the PE 1 performs advertising to the network device D in the metropolitan area network 1 shown in FIG. 1, then the network device D performs sending to an ASBR, namely, a node H of the backbone network corresponding to D, and then the node H performs sending to the PE 3.

Optionally, when the third network device further obtains the second segment identifier, the third network device may further send the second segment identifier and a fifth route prefix by using a fifth route advertisement message. In an example, the fifth route prefix may also be referred to as a second destination route prefix.

In an example, the PE 1 may advertise a VPN SID 2 and a fifth route prefix corresponding to the VPN SID 2 to the PE 3, and the fifth route prefix is an IP 5.

The fourth route advertisement message and the fifth route advertisement message may be sent to a same network device, or may be sent to different network devices. To be specific, the third network device may send both the fourth route advertisement message and the fifth route advertisement message to the second network device. For example, the PE 1 sends both the two route advertisement messages to the PE 3. Alternatively, the third network device may send the fourth route advertisement message to the second network device, and send the fifth route advertisement message to another BGP peer. For example, the PE 1 sends the fourth route advertisement message to the PE 3, and sends the fifth route advertisement message to a PE 4.

When the third network device sends the two route advertisement messages to a same device, the third network device may send the two route advertisement messages to the second network device by using a same route advertisement message, where the route advertisement message includes a correspondence between the IP 4 and A2:0:0:0:80::1 and a correspondence between an IP 5 and A2:0:0:0:81::2. Alternatively, the third network device may advertise the two pieces of routing information to the PE 3 by using different route advertisement messages.

S240: After receiving the fourth route advertisement message, the second network device generates, based on the fourth route advertisement message, a forwarding entry including the fourth route prefix and the first segment identifier.

That the forwarding entry generated by the second network device includes the fourth route prefix and the first segment identifier includes the following cases:

1. The fourth route prefix and the first segment identifier are in a same table.
2. The fourth route prefix and the first segment identifier are in different tables, but the second network device may obtain a correspondence between the fourth route prefix and the first segment identifier based on an association relationship.

In the network scenario shown in FIG. 1, after receiving the fourth route advertisement message advertised by the PE 1, the PE 3 may generate, based on the fourth route advertisement message, a forwarding entry including the IP 4 and A2:0:0:0:80::1.

Optionally, after the second network device further receives the fifth route advertisement message, the second network device further generates, based on the fifth route advertisement message, a forwarding entry including the fifth route prefix and the second segment identifier.

The fifth route advertisement message and the fourth route advertisement message received by the second network device may be a same route advertisement message, or may be different route advertisement messages.

To be specific, the second network device stores the correspondence between the fourth route prefix and the first segment identifier.

Optionally, the PE 3 further stores a correspondence between the fifth route prefix and the second segment identifier.

There is no sequence in which S210 and S230 are performed. In the foregoing descriptions, a control plane device in the network obtains routing information corresponding to a network slice, and generates a corresponding forwarding entry based on the routing information. In this case, a network device in the network may forward a packet based on the routing information.

S245: The second network device receives a first packet, and generates a second packet based on the first packet.

After receiving the first packet, the second network device may generate the second packet based on a longest match between a destination address of the first packet and the fourth route prefix, where the second packet includes the first segment identifier.

The PE 3 may receive a first packet sent by a network connected to the PE 3, for example, receive a first packet from a metropolitan area network 2, or a first packet from a cloud POP.

In an example, the destination address of the first packet is the IP 1. In this case, it can be learned from the foregoing related descriptions that the PE 3 stores the forwarding entry including the IP 4. In this case, the PE 3 may generate a second packet based on a longest match between the IP 1 and the IP 4, and the second packet includes the first segment identifier. To be specific, based on the longest match between the IP 1 and the IP 4, the PE 3 stores information that the IP 4 corresponds to A2:0:0:0:80::1. In this case, the PE 3 may encapsulate A2:0:0:0:80::1 into the second packet. In an example, A2:0:0:0:80::1 may be a destination address of the second packet.

Optionally, the second packet generated by the second network device further includes an identifier of a network slice. To be specific, the PE 3 may obtain the identifier of the network slice based on configuration information, and encapsulate the identifier of the network slice into the second packet. The configuration information includes any one of the following: 1. A $65^{th}$ bit to a $72^{nd}$ bit of A2:0:0:0:80/72 are the identifier of the network slice. 2. There is a correspondence between a route prefix and the network slice. In an example, the identifier of the network slice may be carried in a hop-by-hop (Hop by Hop, HBH) options header of the second packet.

Optionally, the PE 3 may further receive a third packet, where an IP address of the third packet is the IP 5. In this case, the PE 3 may generate a fourth packet based on a longest match between the IP 5 and a forwarding entry that includes the fifth route prefix and that is stored in the PE 3, where the fourth packet includes the second segment identifier. For example, if the second segment identifier corresponding to the IP 5 is A2:0:0:0:81::2, the PE 3 may encapsulate A2:0:0:0:81::2 into the third packet to generate the fourth packet. That is, the fourth packet includes the second segment identifier.

Optionally, similar to the second packet, the fourth packet may further include an identifier of the second network slice.

S250: The second network device sends the second packet based on the first network slice.

The second network device may match, based on the first segment identifier in the second packet, the forwarding entry including the second route prefix, and send the second packet based on the first network slice corresponding to the second route prefix.

For example, the PE 3 determines, based on the destination address of the second packet, how to send information about the second packet, where the destination address is the first segment identifier. In an example, the first segment identifier is A2:0:0:0:80::1. Because the PE 3 stores the forwarding entry including A2:0:0:0:80/72, the PE 3 sends, based on a longest match between the first segment identifier A2:0:0:0:80::1 and A2:0:0:0:80/72 and based on that A2:0:0:0:80/72 corresponds to the first network slice, the second packet by using the network slice 128.

A manner in which the second network device determines a network slice corresponding to the second route prefix as the first network slice includes but is not limited to the following three manners:

Manner 1: The second network device stores a correspondence between the second route prefix and the first network slice. For example, the PE 3 stores a correspondence between A2:0:0:0:80/72 and the identifier of the first network slice.

Manner 2: When the second route prefix includes the identifier of the first network slice, the second network device may obtain the identifier of the first network slice from the second route prefix. For example, the PE 3 directly determines, from a $65^{th}$ bit to a $72^{nd}$ bit in A2:0:0:0:80/72, that the identifier of the first network slice is a hexadecimal 80.

Manner 3: When the second network device obtains routing information of the second route prefix by using the first network slice, the second network device stores a correspondence between the second route prefix and an outbound interface corresponding to the second route prefix. The outbound interface is an interface of the first network slice corresponding to the second route prefix. For example, when the PE 3 obtains routing information of A2:0:0:0:80/72 by using the first network slice, an outbound interface 1 corresponding to A2:0:0:0:80/72 is an outbound interface of the first network slice.

Similarly, the second network device may further send the fourth packet based on the second network slice. Details are not described herein again.

Optionally, when the second packet further carries the identifier of the first network slice, when forwarding the second packet, another network device in the backbone network may select, based on the identifier of the network slice, a corresponding network slice to forward the second packet. In this way, not all network devices in the backbone network need to obtain the correspondence between the second route prefix and the first network slice described in Manner 1. Another network device in the backbone network does not need to perform the method for obtaining the identifier of the first network slice from the second route prefix in Manner 2 to determine a network slice corresponding to the second packet, so that a forwarding efficiency is higher.

Correspondingly, the first network device receives the second packet sent by the second network device by using the first network slice. In an example, the PE 3 sends the second packet to a network device I by using the first network slice, and then the device I sends the second packet to a network device H by using the first network slice.

S255: The first network device sends the second packet to the third network device.

After receiving the second packet, the first network device may send the second packet based on a longest match between the first segment identifier and the first route prefix included in the second packet.

For example, after receiving the second packet, the device H matches, based on the destination address, namely, the first segment identifier, of the second packet, a forwarding entry that includes the first route prefix and that is generated by the device H, to send a packet to the network device D. Therefore, the second packet is transmitted to the metropolitan area network, and is transmitted in the metropolitan area network. The network device D may continue to send the second packet based on the destination address. The second packet is finally sent to the PE 1.

After receiving the second packet, the PE 1 may decapsulate the first segment identifier included in the packet, and send the packet to corresponding user equipment based on an original destination address IP 1.

In the foregoing descriptions, in S250 and S255, a manner of forwarding the fourth packet is the same as a manner of forwarding the second packet, and details are not described herein again.

In the foregoing descriptions, in an example, both the metropolitan area network 1 and the backbone network may be networks running SRv6. The first network slice and the second network slice are network slices of the backbone network.

Figure 3:
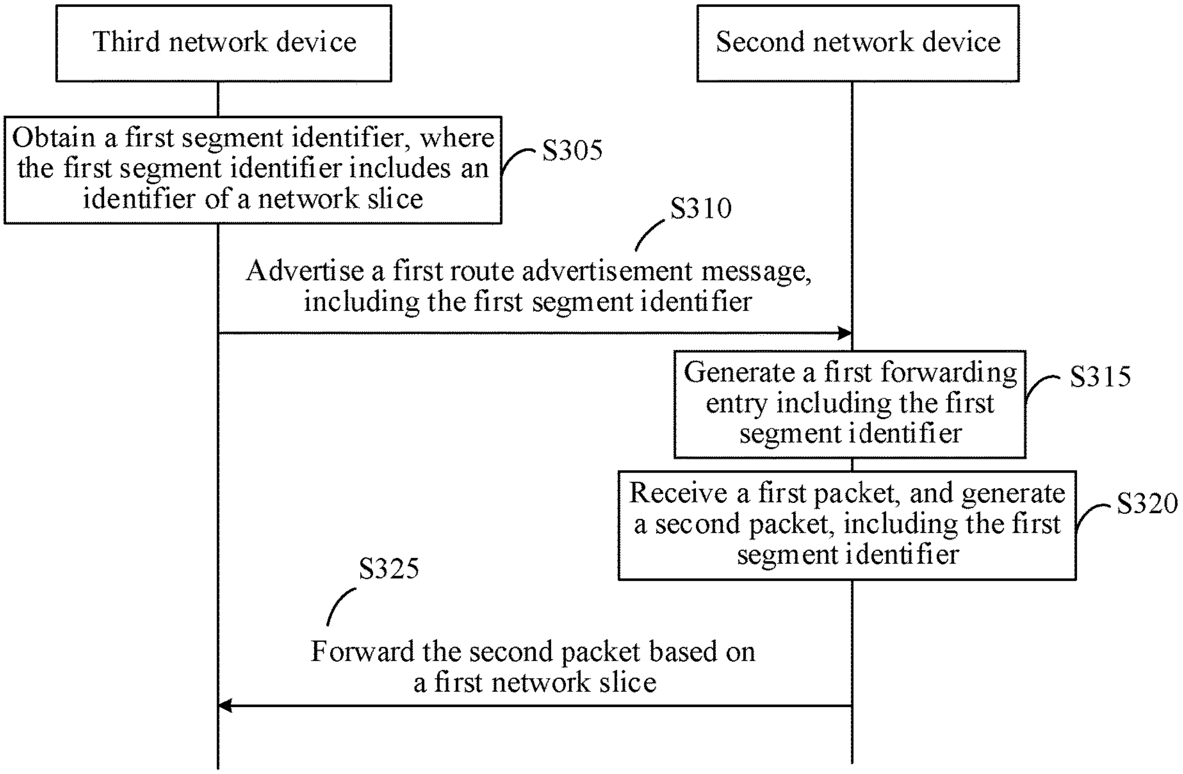
FIG. 3 is a schematic diagram of another route advertisement method according to an embodiment of this application.

As shown in FIG. 3, a schematic flowchart of another route advertisement method is provided. An example in which a method example shown in FIG. 3 is applied to the network scenario shown in FIG. 1 is used, to briefly describe the another route advertisement method provided in this application.

As shown in FIG. 3, the method may be applied to a network including a second network device and a third network device. The second network device and the third network device may be any physical network device or virtual network device that supports a routing function. The second network device and the third network device may belong to a same AS or IGP domain, or different AS or IGP domains.

In the network scenario shown in FIG. 1, the third network device may be the PE 1 in the metropolitan area network, and the second network device may be the PE 3 in the backbone network. Alternatively, the third network device may be the PE 1 in the metropolitan area network, and the second network device may be the network device D in the metropolitan area network. The method example includes the following steps.

S305: The third network device obtains a first segment identifier, where the first segment identifier includes an identifier of a first network slice.

In the network scenario shown in FIG. 1, the PE 1 obtains the first segment identifier, and the first segment identifier includes the identifier of the first network slice.

The first network slice may be a network slice in the metropolitan area network in which the PE 1 is located, or may be a network slice in a backbone network connected to a network in which the PE 1 is located.

A manner in which the first network device obtains the first segment identifier is similar to the manner in S230 in the method example provided in FIG. 2. Details are not described herein again in this application.

S310: The third network device advertises a first route advertisement message, where the first route advertisement message includes the first segment identifier.

A manner in which the third network device advertises the first route advertisement is similar to the manner in S235 in the method example provided in FIG. 2. Details are not described herein again in this application.

S315: The second network device generates a first forwarding entry including the first segment identifier.

After obtaining the first route advertisement message advertised by the third network device, the second network device may generate the first forwarding entry including the first segment identifier. In an example, the first forwarding entry further includes a first route prefix included in the first route advertisement message.

S320: The second network device receives a first packet, and generates a second packet based on the first packet, where the second packet includes the first segment identifier.

The second network device may determine, based on a longest match between a destination address of the received first packet and the first route prefix, a segment identifier corresponding to the first packet as the first segment identifier. In this way, the first segment identifier is encapsulated into the first packet, to obtain the second packet.

Optionally, a hop-by-hop options header of the second packet further includes the identifier of the first network slice.

Then, the second network device may send the second packet based on the identifier of the first network slice included in the first segment identifier and the first network slice.

In an example, the first segment identifier includes a VPN SID.

The foregoing route advertisement method shown in FIG. 3 and the route advertisement method shown in FIG. 2 are based on a same or similar technical essence. For detailed content in related steps in FIG. 3, refer to descriptions of similar parts in FIG. 2. Details are not described herein again.

The foregoing describes method embodiments provided in this application, and the following describes a network device provided in this application.

This application provides an apparatus (for example, a forwarder/network device). The apparatus has a function of implementing behavior of the network device in the foregoing methods. The function may be implemented based on hardware, or may be implemented based on hardware executing corresponding software. The hardware or the software includes one or more modules corresponding to the foregoing function. For example, refer to FIG. 4, FIG. 5, and FIG. 6.

Figure 4:
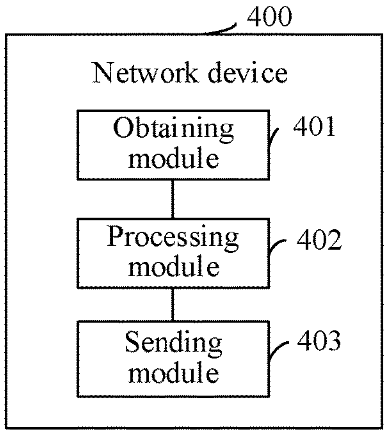
FIG. 4 is a schematic diagram of a structure of a network device according to an embodiment of this application.

As shown in FIG. 4, FIG. 4 is a schematic diagram of a structure of a network device 400 according to an embodiment of this application. The network device 400 may be configured to perform the method performed by the third network device in the method shown in FIG. 2 or FIG. 3. To be specific, the network device 400 may be configured to perform the method performed by the network device, for example, the PE 1, in any example method in FIG. 2 or FIG. 3. As shown in FIG. 4, the network device 400 includes an obtaining module 401 and a sending module 403, and optionally, may further include a processing module 402. The obtaining module 401 may be configured to perform a related method for obtaining, by the network device, the first segment identifier corresponding to the first network slice in the foregoing method embodiment. The sending module 403 may be configured to perform a related method for sending the second packet in the foregoing method.

It should be noted that, when the network device provided in the embodiment of FIG. 4 performs the foregoing route advertisement method, division into the foregoing functional units is merely used as an example for description. During actual application, the foregoing functions may be allocated to different functional units for implementation based on a requirement. In other words, an internal structure of the network device is divided into different functional units, to implement all or some of the functions described above. Alternatively, a unified functional unit is used to complete the functions of a plurality of units. It should be understood that the network device 400 and the foregoing route advertisement method embodiment belong to a same concept. Herein, only steps performed by units of the network device are described by using examples, but it does not mean that the network device does not perform other steps or optional methods in the foregoing embodiments. For a specific implementation process of the network device, refer to related descriptions in the foregoing method example. Details are not described herein again.

Figure 5:
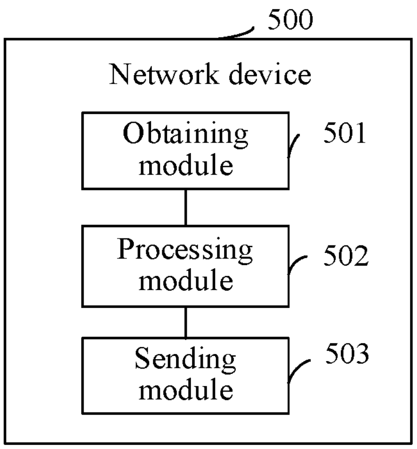
FIG. 5 is a schematic diagram of a structure of a network device according to an embodiment of this application.

As shown in FIG. 5, FIG. 5 is a schematic diagram of a structure of a network device 500 according to an embodiment of this application. The network device 500 may be configured to perform the method performed by the second network device, for example, the method performed by the PE 3 in FIG. 1, in the method shown in FIG. 2 or FIG. 3. As shown in FIG. 5, the network device 500 includes an obtaining module 501 and a processing module 502, and optionally, further includes a sending module 503. The obtaining module 501 may be configured to perform a related method for obtaining the route advertisement message or receiving the first packet by the second network device in the foregoing method. The processing module 502 may be configured to perform a related method for generating the forwarding entry or generating the second packet in the foregoing method. The sending module 503 may be configured to perform a related method for sending the second packet in the foregoing method.

It should be noted that, when the network device provided in FIG. 5 performs the foregoing route advertisement method, division into the foregoing functional units is merely used as an example for description. During actual application, the foregoing functions may be allocated to different functional units for implementation based on a requirement. In other words, an internal structure of the network device is divided into different functional units, to implement all or some of the functions described above. Alternatively, a unified functional unit is used to complete the functions of a plurality of units. It should be understood that the network device 500 and the foregoing route advertisement method embodiment belong to a same concept. Herein, only steps performed by units of the network device are described by using examples, but it does not mean that the network device does not perform other steps or optional methods in the foregoing embodiments. For a specific implementation process of the network device, refer to related descriptions in the foregoing method example. Details are not described herein again.

Figure 6:
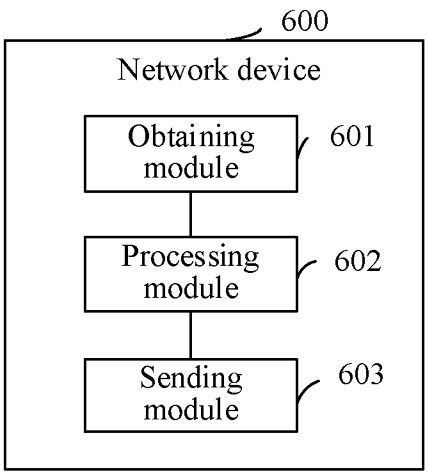
FIG. 6 is a schematic diagram of a structure of a network device according to an embodiment of this application.

As shown in FIG. 6, FIG. 6 is a schematic diagram of a structure of a network device 600 according to an embodiment of this application. The network device 600 may be configured to perform the method performed by the first network device in the method shown in FIG. 2. As shown in FIG. 6, the network device 600 includes an obtaining module 601, a processing module 602, and a sending module 603. The obtaining module 601 may be configured to perform a related method for obtaining the route advertisement message in the foregoing method. The processing module 602 may be configured to perform a related method for generating the second route prefix based on the first route prefix in the foregoing method. The sending module 603 may be configured to perform a related method for sending the route advertisement message or sending the second packet in the foregoing method.

It should be noted that, when the network device provided in FIG. 6 performs the foregoing route advertisement method, division into the foregoing functional units is merely used as an example for description. During actual application, the foregoing functions may be allocated to different functional units for implementation based on a requirement. In other words, an internal structure of the network device is divided into different functional units, to implement all or some of the functions described above. Alternatively, a unified functional unit is used to complete the functions of a plurality of units. It should be understood that the network device 600 and the foregoing route advertisement method belong to a same concept. Herein, only steps performed by units of the network device are described by using examples, but it does not mean that the network device does not perform other steps or optional methods in the foregoing embodiments. For a specific implementation process of the network device, refer to related descriptions in the foregoing method examples. Details are not described herein again.

Figure 7:
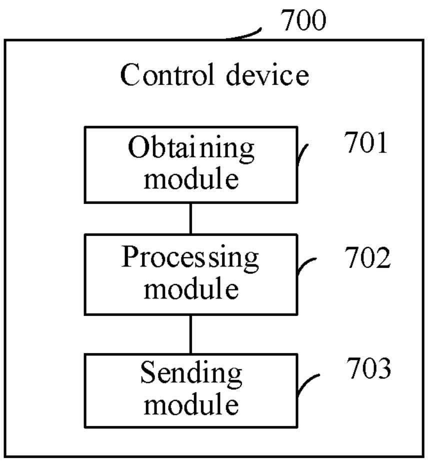
FIG. 7 is a schematic diagram of a structure of a control device according to an embodiment of this application.

FIG. 7 is a schematic diagram of a structure of a control device 700 according to an embodiment of this application. The control device 700 may be configured to perform the method performed by the control device in the method shown in FIG. 2. As shown in FIG. 7, the control device 700 includes an obtaining module 701 and a sending module 703, and optionally, further includes a processing module 702. The obtaining module 701 may be configured to perform a related method for obtaining the first segment identifier in the foregoing method. The sending module 603 may be configured to perform a related method for sending the first segment identifier in the foregoing method.

It should be noted that, when the control device provided in FIG. 7 performs the foregoing route advertisement method, division into the foregoing functional units is merely used as an example for description. During actual application, the foregoing functions may be allocated to different functional units for implementation based on a requirement. In other words, an internal structure of the control device is divided into different functional units, to implement all or some of the functions described above. Alternatively, a unified functional unit is used to complete the functions of a plurality of units. It should be understood that the control device 700 and the foregoing route advertisement method belong to a same concept. Herein, only steps performed by units of the control device are described by using examples, but it does not mean that the control device does not perform other steps or optional methods in the foregoing embodiments. For a specific implementation process of the control device, refer to related descriptions in the foregoing method examples. Details are not described herein again.

Corresponding to the method examples and the virtual apparatus examples provided in this application, this application further provides a network apparatus. The following describes a hardware structure of the network apparatus.

Figure 8:
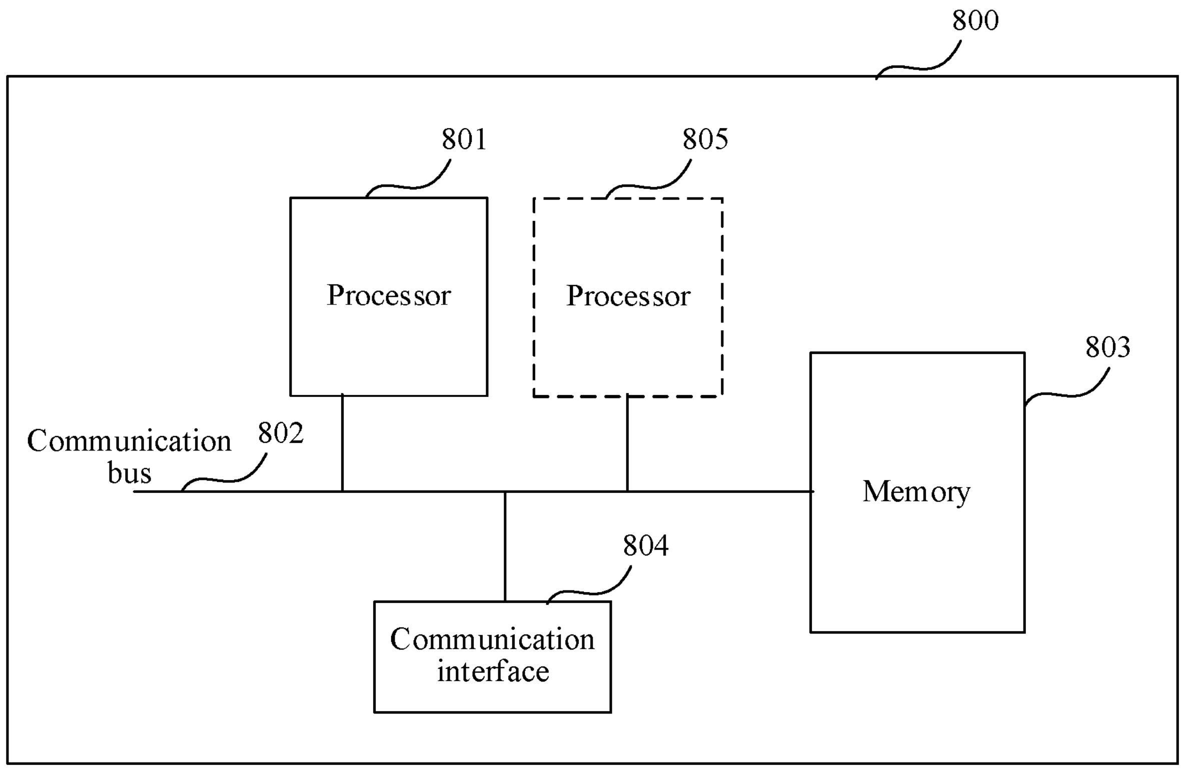
FIG. 8 is a schematic diagram of a structure of a network apparatus according to an embodiment of this application.

FIG. 8 is a schematic diagram of a structure of a network apparatus 800 according to this application. The apparatus 800 may perform the method performed by the first network device, the second network device, the third network device, or the control device in the method example shown in FIG. 2 or FIG. 3. With reference to the schematic diagram of the structure of the apparatus shown in FIG. 8, the apparatus 800 includes at least one processor 801, a communication bus 802, and at least one communication interface 804. Optionally, the apparatus 800 may further include a memory 803.

Optionally, the network apparatus 800 may be implemented by using a general bus architecture, for example, the communication bus 802 shown in FIG. 8.

The processor 801 may be a general-purpose CPU, an NP, a microprocessor, or may be one or more integrated circuits, for example, an application-specific integrated circuit (ASIC), a programmable logic device (PLD), or a combination thereof, configured to implement the solutions of this application. The PLD may be a complex programmable logic device (CPLD), a field programmable logic gate array (FPGA), a generic array logic (GAL), or any combination thereof.

The communication bus 802 is configured to transmit information between the foregoing components. The communication bus 802 may be classified into an address bus, a data bus, a control bus, and the like. For ease of representation, only one bold line is used to represent the bus in the figure, but this does not mean that there is only one bus or only one type of bus.

The memory 803 may be a read-only memory (ROM) or another type of static storage device capable of storing static information and instructions, or may be a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile optical disc, a Blu-ray optical disc, or the like), a magnetic disk storage medium or another magnetic storage device, or any other medium capable of carrying or storing expected program code in a form of instructions or a data structure and capable of being accessed by a computer. This is not limited thereto. The memory 803 may exist independently, and is connected to the processor 801 through the communication bus 802. Alternatively, the memory 803 and the processor 801 may be integrated together.

The communication interface 804 is configured to communicate with another device or a communication network by using any transceiver-type apparatus. The communication interface 804 includes a wired communication interface, or may include a wireless communication interface. The wired communication interface may be, for example, an ethernet interface. The ethernet interface may be an optical interface, an electrical interface, or a combination thereof. The wireless communication interface may be, for example, a wireless local area network (WLAN) interface, a cellular network communication interface, or a combination thereof. The communication interface 804 may be further configured to receive a configuration instruction, so that the processor 801 may obtain a first identifier based on an indication of the configuration instruction, obtain a first packet based on the first identifier, and the like. The network apparatus may further include another communication interface, and the another communication interface is configured to receive the configuration instruction.

During specific implementation, in an example, the network apparatus 800 may include a plurality of processors, for example, the processor 801 and a processor 805 shown in FIG. 8. Each of the processors may be a single-core processor (single-CPU) or a multi-core processor (multi-CPU). The processor herein may be one or more devices, circuits, and/or processing cores configured to process data (for example, computer program instructions).

In some embodiments, the memory 803 is configured to store program code 810 for executing the solutions of this application, and the processor 801 may execute the program code 810 stored in the memory 803. That is, the network apparatus 800 may implement, by using the processor 801 and the program code 810 in the memory 803, the method provided in the foregoing method example.

Figure 9:
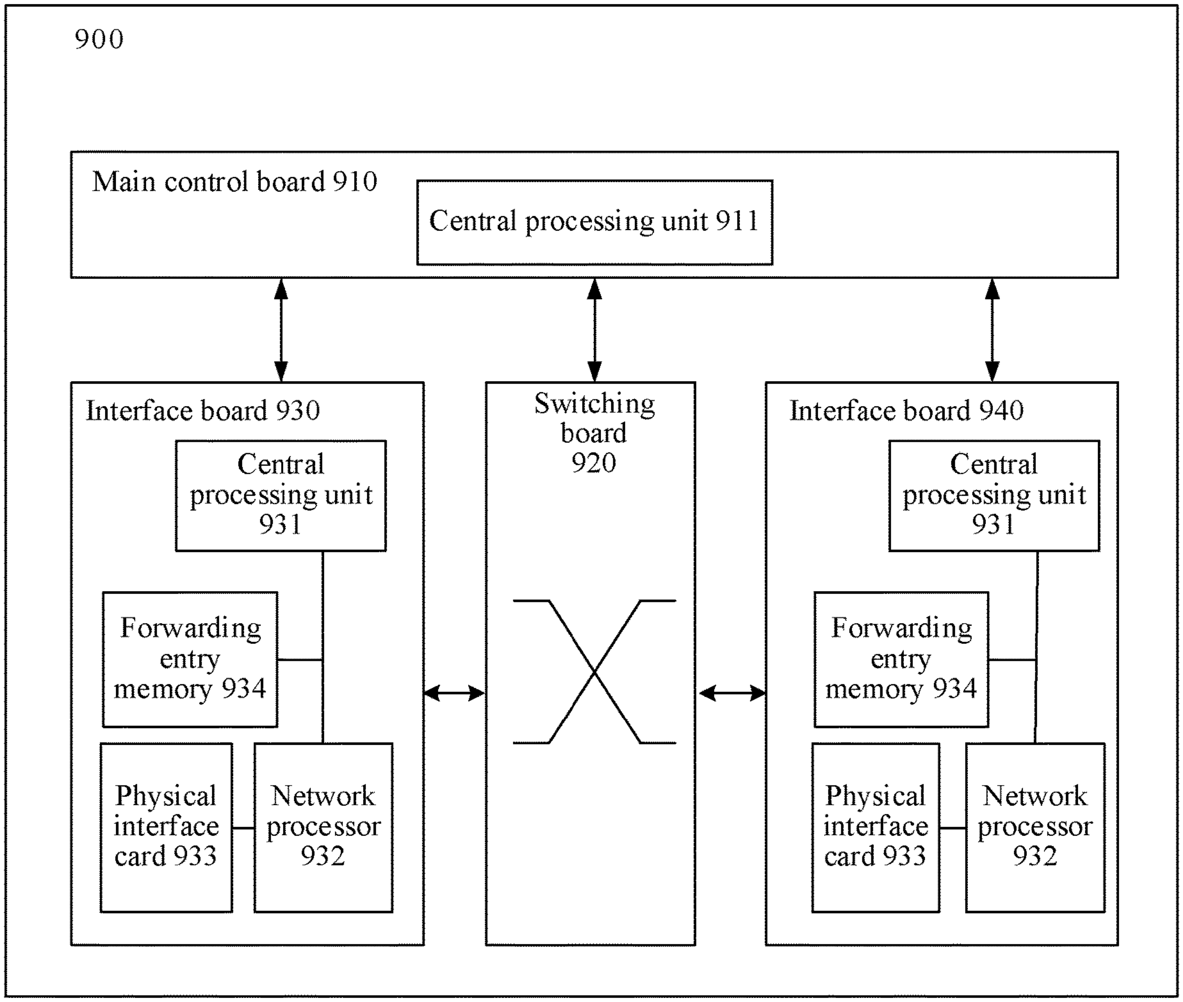
FIG. 9 is a schematic diagram of a structure of a network apparatus according to an embodiment of this application.

FIG. 9 is a schematic diagram of a structure of a network apparatus 900 according to an embodiment of this application. The apparatus 900 may perform the method performed by the first network device, the second network device, the third network device, or the control device in FIG. 2 or FIG. 3. Refer to the schematic diagram of the structure of the apparatus shown in FIG. 9. The apparatus 900 includes a main control board and one or more interface boards. The main control board and the interface boards are communicatively connected. The main control board is also referred to as a main processing unit (main processing unit, MPU) or a route processor card (route processor card). The main control board is responsible for controlling and managing each component in the apparatus 900, including route computation, device management, and function maintenance. The interface board is also referred to as a line processing unit (LPU) or a line card, and is configured to forward data. In some embodiments, the apparatus 900 may also include a switching board, the switching board is communicatively connected to the main control board and the interface board, the switching board is configured to forward data between the interface boards, and the switching board may also be referred to as a switch fabric unit (SFU). The interface board includes a central processing unit, a memory, a forwarding chip, and a physical interface card (PIC). The central processing unit is communicatively connected to the memory, a network processor, and the physical interface card. The memory is configured to store a forwarding table. The forwarding chip is configured to forward a received packet based on the forwarding table stored in the memory. If a destination address of the packet is an address of the apparatus 900, the packet is sent to the central processing unit (CPU) such as a central processing unit 931 for processing. If a destination address of the packet is not an address of the apparatus 900, a next hop and an outbound interface corresponding to the destination address are found from the forwarding table based on the destination address, and the packet is forwarded to the outbound interface corresponding to the destination address. The forwarding chip may be a network processor (network processor, NP). The PIC, also referred to as a subcard, can be installed on the interface board. The PIC is responsible for converting an optical or electrical signal to a data packet, checking validity of the data packet, and forwarding the data packet to the forwarding chip for processing. In some embodiments, the central processing unit may also perform a function of the forwarding chip, for example, implement software forwarding based on a general-purpose CPU, so that the interface board does not need the forwarding chip. A communication connection between the main control board, the interface board, and the switching board may be implemented through a bus. In some embodiments, the forwarding chip may be implemented by using an application-specific integrated circuit (ASIC) or a field programmable gate array (FPGA).

Logically, the apparatus 900 includes a control plane and a forwarding plane. The control plane includes a main control board and a central processing unit, and the forwarding plane includes components, such as the memory, the PIC, and the NP, for performing forwarding. The control plane performs functions such as a function of a router, generating a forwarding table, processing signaling and protocol packets, and configuring and maintaining a status of a device. The control plane delivers the generated forwarding table to the forwarding plane. On the forwarding plane, the NP searches the forwarding table delivered by the control plane to forward a packet received by the PIC of the apparatus 900. The forwarding table delivered by the control plane may be stored in the memory. In some embodiments, the control plane and the forwarding plane may be completely separated, and are not on a same device.

It should be noted that, there may be one or more main control boards. When there are a plurality of main control boards, the main control boards may include an active main control board and a standby main control board. There may be one or more interface boards. A network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a network device such as a low-end switch or router) has a weak data exchange and processing capability. A specific architecture that is to be used depends on a specific networking deployment scenario. This is not limited herein.

In a possible design, this application provides a network device. The network apparatus includes a controller and a first forwarding sub-device. The first forwarding sub-device includes an interface board, and may further include a switching board. The first forwarding sub-device is configured to perform a function of the interface board in FIG. 9, and may further perform a function of the switching board in FIG. 9. The controller includes a receiver, a processor, a transmitter, a random access memory, a read-only memory, and a bus. The processor is coupled to the receiver, the transmitter, the random access memory, and the read-only memory through the bus. When the controller needs to be run, a basic input/output system built into the read-only memory or a bootloader (bootloader) in an embedded system is used to boot a system to start, to boot the controller to enter a normal running state. After the controller enters the normal running state, an application program and an operating system are run in the random access memory, to enable the processor to execute a function of the main control board in the foregoing aspect.

Method or algorithm steps described in combination with the content disclosed in this application may be implemented by hardware, or may be implemented by a processor by executing software instructions. The software instructions may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other form well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in user equipment. Certainly, the processor and the storage medium may exist in the user equipment as discrete components.

This application provides a computer storage medium, configured to store a program, code, or instructions that is/are used by the foregoing network device. When executing the program, the code, or the instructions, a processor or a hardware device may complete functions or steps of the foregoing network device.

An embodiment of this application further provides a chip system, including a processor, where the processor is coupled to a memory. The memory is configured to store a program or instructions. When the program or the instructions is/are executed by the processor, the chip system is enabled to implement the method according to any one of the foregoing method examples.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a system on a chip (SoC), a central processing unit (CPU), a network processor (NP), a digital signal processor (DSP), a microcontroller unit (MCU), a programmable controller (PLD), or another integrated chip.

It should be understood that the steps in the foregoing method examples may be completed by using a hardware integrated logic circuit or instructions in a form of software in the processor. The steps in the methods disclosed with reference to embodiments of this application may be directly performed and completed by a hardware processor, or may be performed and completed by using a combination of hardware in the processor and a software module.

Figure 10:
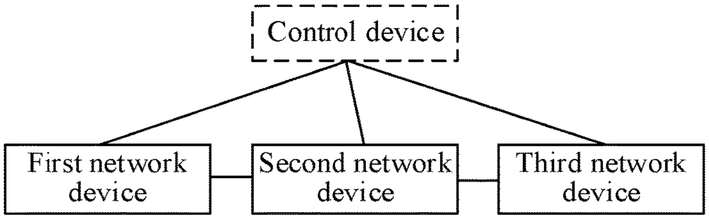
FIG. 10 is a schematic diagram of a network system according to an embodiment of this application.

This application provides a network system. As shown in FIG. 10, the network system includes a second network device and a third network device. Optionally, the system further includes a first network device. Optionally, the system further includes a control device. The second network device may perform the method performed by the second network device in the method examples shown in FIG. 2 and FIG. 3, and the third network device may perform the method performed by the third network device in FIG. 2 or FIG. 3. The first network device may perform the method performed by the first network device in the method example shown in FIG. 2. The control device may perform the method performed by the control device in the method example shown in FIG. 2.

A person skilled in the art should be aware that in the foregoing one or more examples, functions described in this application may be implemented by hardware or a combination of hardware and software. When the functions are implemented by the combination of hardware and software, the software may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

It should be understood that the processor mentioned in embodiments of the present invention may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be understood that the memory mentioned in embodiments of the present invention may be a volatile memory or a non-volatile memory, or may include a volatile memory and a non-volatile memory. The non-volatile memory may be a ROM, a PROM, an erasable EPROM, an EEPROM, or a flash memory. The volatile memory may be a random access memory RAM, and serves as an external cache. By way of example, and not limitation, RAMs of many forms are applicable, such as an SRAM, a DRAM, an SDRAM, a DDR SDRAM, an ESDRAM, an SLDRAM, and a DR RAM.

It should be noted that the memory described in this specification is intended to include but is not limited to these memories and any memory of another proper type.

In various embodiments of this application, sequence numbers of the foregoing processes do not mean execution sequences. Some or all of the steps may be performed in parallel or in sequence. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, a terminal device, or the like) to perform all or some of the steps of the methods in embodiments of this application. The foregoing storage medium includes any medium, such as a USB flash drive, a removable hard disk, a read-only memory (ROM), a random access memory (RAM), a magnetic disk, or an optical disc, that can store program code.

Related parts of the method embodiments of the present invention may be mutually referenced. The apparatus provided in each apparatus embodiment is configured to perform the method provided in the corresponding method embodiment. Therefore, each apparatus embodiment may be understood with reference to a related part in the related method embodiment.

Structural diagrams of the apparatuses in the apparatus embodiments of the present invention merely show simplified designs of the corresponding apparatuses. In an actual application, the apparatus may include any quantity of transmitters, receivers, processors, memories, and the like, to implement the function or operation performed by the apparatus in each apparatus embodiment of the present invention. However, all apparatuses that can implement this application shall fall within the protection scope of this application.

Names of messages/frames/instruction information, modules or units, and the like provided in embodiments of the present invention are only examples, and other names may be used provided that functions of the messages/frames/instruction information, the modules or units, and the like are the same.

The terms used in embodiments of the present invention are merely for the purpose of illustrating specific embodiments, and are not intended to limit the present invention. The terms "a", "said" and "the" of singular forms used in embodiments and the appended claims of the present invention are also intended to include plural forms, unless otherwise specified in the context clearly. It should also be understood that, the term "and/or" used in this specification indicates and includes any or all possible combinations of one or more associated listed items.

In the foregoing specific implementations, the objectives, technical solutions, and benefits of the present invention are further described in detail. It should be understood that different embodiments may be combined, and the foregoing descriptions are merely specific implementations of the present invention, but are not intended to limit the protection scope of the present invention. Any combination, modification, equivalent replacement, improvement, or the like made without departing from the spirit and principle of the present invention shall fall within the protection scope of the present invention. In conclusion, the foregoing embodiments are merely intended for describing the technical solutions of this application, but not for limiting this application. Although this application is described in detail with reference to the foregoing embodiments, a person of ordinary skill in the art should understand that the technical solutions described in the foregoing embodiments may still be modified, or some technical features in the technical solutions may be equivalently replaced. These modifications or replacements do not make the essence of the corresponding technical solutions fall outside the scope of the technical solutions of embodiments of this application.

What is claimed is:

1. A method, comprising:

obtaining, by a third network device, a first segment identifier, wherein the first segment identifier comprises a locator address of the third network device and a first identifier, a network between a second network device and a first network device is divided into a plurality of network slices, and the first identifier corresponds to a first network slice of the plurality of network slices; and sending, by the third network device, a route advertisement message comprising the first segment identifier and a first destination route prefix to the second network device, wherein the second network device generates a forwarding entry comprising the first destination route prefix and the first segment identifier, and the forwarding entry is used by the second network device to send a packet to the first network device using the first network slice.

2. The method according to claim 1, wherein the first identifier comprises an identifier of the first network slice.

3. The method according to claim 1, wherein the first segment identifier is a subnet prefix of the locator address, and the method further comprises:

obtaining, by the third network device, a second segment identifier, wherein the second segment identifier comprises the locator address and a second identifier, and the second identifier corresponds to a second network slice; and sending, by the third network device, a route advertisement message comprising the second segment identifier and a second destination route prefix to the second network device.

4. The method according to claim 3, further comprising:

sending, by the second network device, a route prefix comprising the locator address to the first network device.

5. The method according to claim 1, wherein the first segment identifier comprises a virtual private network segment identifier (VPN SID).

6. The method according to claim 1, wherein the first segment identifier comprises a function part, and the function part indicates to obtain an identifier of a network slice from the first segment identifier.

7. The method according to claim 1, wherein the second network device and the third network device are border gateway protocol peers.

8. An apparatus, comprising:

at least one processor; and at least one non-transitory computer-readable storage medium storing a program to be executed by the at least one processor, the program including instructions to:

obtain a first segment identifier, wherein the first segment identifier comprises a locator address of the apparatus and a first identifier, a network between a second network device and a first network device is divided into a plurality of network slices, and the first identifier corresponds to a first network slice of the plurality of network slices; and send a route advertisement message comprising the first segment identifier and a first destination route prefix to the second network device, wherein the second network device generates a forwarding entry comprising the first destination route prefix and the first segment identifier, and the forwarding entry is used by the second network device to send a packet to the first network device by using the first network slice.

9. The apparatus according to claim 8, wherein the first identifier comprises an identifier of the first network slice.

10. The apparatus according to claim 8, wherein the first segment identifier is a subnet prefix of the locator address, and wherein the instructions further include instructions to:

obtain a second segment identifier, wherein the second segment identifier comprises the locator address and a second identifier, and the second identifier corresponds to a second network slice; and send a route advertisement message comprising the second segment identifier and a second destination route prefix to the second network device.

11. The apparatus according to claim 10, wherein the instructions further include instructions to:

send a route prefix comprising the locator address to the first network device.

12. The apparatus according to claim 8, wherein the first segment identifier comprises a virtual private network segment identifier (VPN SID).

13. The apparatus according to claim 8, wherein the first segment identifier comprises a function part, and the function part indicates to obtain an identifier of a network slice from the first segment identifier.

14. The apparatus according to claim 8, wherein the second network device and the apparatus are border gateway protocol peers.

15. A non-transitory storage medium storing a program, which when executed by one or more processors, causes the one or more processors to perform operations, the operations comprising:

obtaining a first segment identifier, wherein the first segment identifier comprises a locator address of a third network device and a first identifier, a network between a second network device and a first network device is divided into a plurality of network slices, and the first identifier corresponds to a first network slice of the plurality of network slices; and sending a route advertisement message comprising the first segment identifier and a first destination route prefix to the second network device, wherein the second network device generates a forwarding entry comprising the first destination route prefix and the first segment identifier, and the forwarding entry is used by the second network device to send a packet to the first network device by using the first network slice.

16. The non-transitory storage medium according to claim 15, wherein the first identifier comprises an identifier of the first network slice.

17. The non-transitory storage medium according to claim 15, wherein the first segment identifier is a subnet prefix of the locator address, and wherein the operations further comprise:

obtaining a second segment identifier, wherein the second segment identifier comprises the locator address and a second identifier, and the second identifier corresponds to a second network slice; and sending a route advertisement message comprising the second segment identifier and a second destination route prefix to the second network device.

18. The non-transitory storage medium according to claim 17, wherein the operations further comprise:

sending a route prefix comprising the locator address to the first network device.

19. The non-transitory storage medium according to claim 15, wherein the first segment identifier comprises a virtual private network segment identifier (VPN SID).

20. The non-transitory storage medium according to claim 15, wherein the first segment identifier comprises a function part, and the function part indicates to obtain an identifier of a network slice from the first segment identifier.

* * * * *